(12) United States Patent
Reddig et al.

(10) Patent No.: US 7,642,784 B2
(45) Date of Patent: Jan. 5, 2010

(54) ELECTROMAGNETIC SURVEY SYSTEM WITH MULTIPLE SOURCES

(75) Inventors: Ransom Reddig, Austin, TX (US); Philip Heelan, Co. Clare (IE)

(73) Assignee: WesternGeco L.L.C., Houston, TX (US)

(*) Notice: Subject to any disclaimer, the term of this patent is extended or adjusted under 35 U.S.C. 154(b) by 0 days.

(21) Appl. No.: 11/953,659

(22) Filed: Dec. 10, 2007

(65) Prior Publication Data

US 2008/0143335 A1 Jun. 19, 2008

Related U.S. Application Data

(62) Division of application No. 11/163,066, filed on Oct. 4, 2005, now Pat. No. 7,411,399.

(51) Int. Cl.
*G01V 3/08* (2006.01)
*G01V 3/15* (2006.01)
(52) U.S. Cl. .................. 324/329; 324/354; 324/365
(58) Field of Classification Search .......... 324/323, 324/326–329, 330–332, 344–345, 347–350, 324/354, 357–365; 307/71, 73; 342/444–450, 342/459, 463
See application file for complete search history.

(56) References Cited

U.S. PATENT DOCUMENTS

| | | | | |
|---|---|---|---|---|
| 3,529,682 | A * | 9/1970 | Coyne et al. ............... | 175/45 |
| 4,617,518 | A | 10/1986 | Srnka | |
| 4,633,182 | A | 12/1986 | Dzwinel | |
| 5,373,301 | A * | 12/1994 | Bowers et al. ............ | 343/742 |
| 5,955,884 | A * | 9/1999 | Payton et al. ............. | 324/339 |
| 6,771,223 | B1 * | 8/2004 | Shoji et al. ................ | 343/702 |
| 2005/0285786 | A1 * | 12/2005 | Fayyaz ..................... | 342/372 |
| 2006/0001428 | A1 * | 1/2006 | Milne et al. ............... | 324/360 |
| 2006/0279470 | A1 * | 12/2006 | Brown ...................... | 343/797 |

FOREIGN PATENT DOCUMENTS

| | | |
|---|---|---|
| EP | 463263 A1 * | 1/1992 |
| GB | 2070345 | 9/1981 |
| GB | 2390904 | 1/2004 |
| GB | 2404444 | 2/2005 |

(Continued)

OTHER PUBLICATIONS

Boerner, David E. et al., Orthogonality in CSAMT and MT Measurements, Geophysics, vol. 58, No. 7, Jul. 1993, pp. 924-934.

(Continued)

*Primary Examiner*—Bot L LeDynh
(74) *Attorney, Agent, or Firm*—Dan C. Hu; Liangang (Mark) Ye; Jeffrey E. Griffin

(57) ABSTRACT

Multiple sources are provided for a transmitter cable for use in electromagnetic surveying. The transmitter cable includes a dipole antenna comprising a pair of spaced apart electrodes mounted on their respective cables. Two antennas may be powered from each source. Alternatively, the outputs of each source are connected to a common antenna pair. A single large power supply may be mounted on a vessel to supply power through the tow cable. Alternatively, a number of power supplies may be provided aboard the vessel, with each power supply having dedicated conductors through the tow cable to power the plurality of current sources.

12 Claims, 2 Drawing Sheets

FOREIGN PATENT DOCUMENTS

| | | |
|---|---|---|
| GB | 2413851 | 11/2005 |
| GB | 2415785 | 1/2006 |
| GB | 2420855 | 6/2006 |
| WO | WO0214906 | 2/2002 |
| WO | WO2007/040743 | 4/2007 |

OTHER PUBLICATIONS

Chave, Alan D. et al., Controlled Electromagnetic Sources for Measuring Electrical Conductivity Beneath the Oceans, Journal of Geophysical Research, vol. 87, No. B7, pp. 5327-5338, Jul. 10, 1982.

Chave, Alan D. et al., Electrical Exploration Methods in Applied Geophysics Volume 2, Electrical Exploration Methods for the Seafloor, Chapter 12, 1991, pp. 931-966.

Constable, S. et al., Marine Controlled-Source Electromagnetic Sounding, Journal of Geophysical Research, vol. 101, No. B3, Mar. 10, 1996, pp. 5519-5530.

Constable, S. et al., Occam's Inversion: A Practical Algorithm for Generating Smooth Models from Electromagnetic Sounding Data, Geophysics, vol. 52, No. 3, Mar. 1987, pp. 289-300.

Edwards, R. Nigel, On the Resource Evaluation of Marine Gas Hydrate Deposits Using Sea-Floor Transient Electric Dipole-Dipole Methods, Geophysics vol. 62, No. 1, Jan.-Feb. 1997, pp. 63-74.

Edwards, R.N., Controlled Source Electromagnetic Mapping of the Crust, Encyclopedia of Solid Earth Geopysics, ed. James D. Van Nostrand Reinhold, New York, 1989, pp. 127-138.

Yuan, J. et al., Electromagnetic Assessment of Offshore Methane Hydrate Deposits on the Cascadia Margin, American Geophyiscal Union Fall Meeting, San Francisco, 1998, pp. 363-375.

Kearey, Philip, The Encyclopedia of the Solid Earth Sciences, Blackwell Scientific Publications.

Evans, Rob L. et al., On the Electrical Nature of the Axial Melt Zone at 13 Degrees N on the East Pacific Rise, Journal of Geophysical Research, vol. 99, No. B1, Jan. 10, 1994, pp. 577-588.

Flosadottir, A. et al., Marine Controlled-Source Electromagnetic Sounding, Journal of Geophysical Research, vol. 101, No. B3, Mar. 10, 1996, pp. 5507-5517.

U.S. Dept. of Energy Office of Basic Energy Sciences, Division of Engineering and Geosciences, Two and Three-Dimensional Magnetotelluric Inversion, Technical Report: Dec. 1, 1991-May 31, 1994.

Grant, I.S. et al., Electromagnetism, Second Edition, John Wiley & Sons.

Kaufman, A. et al., Methods in Geochemistry and Geophysics, 16.

Kvenvolden, K. et al., A Primer on the Geological Occurrence of Gas Hydrate, Gas Hydrates: Relevance to World Margin Stability and Climate Change, Geological Society, London, Special Publications, 137, 9-30.

MacGregor, L. et al., The RAMESSES Experiment-III. Controlled-Source Electromagnetic Sounding of the Reykjanes Ridge . . . , Geophys. J. Int. 1998, 135, pp. 773-789.

MacGregor, L. et al., Use of Marine Controlled Source Electromagnetic Sounding for Sub-Basalt Exploration, EAGE 61st Conference and Technical Exhibition, Helsinki, Finland, Jun. 7-11, 1999.

Nekut, A. et al., Petroleum Exploration Using Controlled-Source Electromagnetic Methods, Proceedings of the IEEE, vol. 77, No. 2, Feb. 1989.

Sinha, M. C. et al., Evidence for Accumulated Melt Beneath the Slow-Spreading Mid-Atlantic Ridge, Phil. Trans. R. Soc. Land. A, 355, 1997, pp. 233-253.

Sinha, Martin, Controlled Source EM Sounding: Survey Design Considerations for Hydrocarbon Applications, LITHOS Science Report Apr. 199, 1, 95-101.

Sinha, M. et al., An Active Source Electromagnetic Sounding System for Marine Use, Marine Geophysical Researches 1990, 12: 59-68.

Strack, K. et al., Integrating Long-Offset Transient Electromagnetic (LOTEM) with Seismics in an Exploration Environment, Geophysical Prospecting, 1996, 44, 997-1017.

Tseng, H. et al., A Borehole-to-Surface Electromagnetic Survey, Geophysics vol. 63, No. 5, pp. 1565-1572.

Das, Umesh C., Apparent Resistivity Curves in Controlled-Source Electromagnetic Sounding Directly Reflecting True Resistivities in a Layered Earth, Geophysics vol. 60, No. 1, Jan.-Feb. 1995, pp. 53-60.

Das, Umesh C., Frequency- and Time-Domain Electromagnetic Responses of Layered Earth-A Multiseparation, Multisystem Approach, Geophysics vol. 60, No. 1, Jan.-Feb. 1995, pp. 285-290.

Thompson, Arthur H. et al., U.S. Statutory Invention Registration H1490, Sep. 5, 1995.

Walker, Peter W. et al., Parametric Estimators for Current Excitation on a Thin Plate, Geophysics vol. 57, No. 6, Jun. 1992, pp. 766-773.

Ward, S.H. et al., Electromagnetic Theory for Geophysical Applications, in Investigations in Geophysics: Electromagnetic Methods in Applied Geophysics, ed. Nabighian, Society of Exploration Geophysicists, Oklahoma, 1988.

Yuan, J. et al., The Assessment of Marine Gas Hydrates through Electrical Remote Sounding: Hydrate without a BSR?, Geophysical Research Letters, vol. 27, Aug. 2000, pp. 2397-2400.

Yuan, Edwards et al., Electromagnetic Assessment of Offshore Methane Hydrate Deposits on the Cascadia Margin, MARELEC 1999.

Maurer, Hansruedi et al., Optimized Design of Geophysical Experiments, SEG Paper.

Grant, I.S. et al., Electromagnetic Waves, Chapter 11, pp. 365-407.

Information Disclosure Statement, filed Mar. 6, 2007, for parent case, U.S. Appl. No. 11/163,066.

Supplemental Information Disclosure Statement, filed Jun. 22, 2007, for parent case, U.S. Appl. No. 11/163,066.

* cited by examiner

ELECTROMAGNETIC SURVEY SYSTEM WITH MULTIPLE SOURCES

FIELD OF THE INVENTION

The present invention relates generally to the field of electromagnetic survey systems used in sub-sea exploration for hydrocarbons and, more particularly, to such a system having a plurality of sources.

BACKGROUND OF THE INVENTION

Various systems have been deployed to determine the response of the earth's sub-surface strata to electromagnetic fields for geophysical research. Electromagnetic (EM) surveying, or sounding, techniques can provide valuable insights into the likely hydrocarbon content of subterranean reservoirs. Lately, EM surveying systems and techniques have been receiving increasing interest in commercial applications in the search for oil and gas.

Seismic techniques are often used during oil exploration to identify the existence, location, and extent of reservoirs in subterranean rock strata. During seismic exploration, a sound signal is transmitted to the sub-surface strata where the signal encounters geologic anomalies. The seismic signal is then reflected back to receivers such as hydrophones for sub-sea exploration. The signals thus received are analyzed for the appearance of the sub-sea structures, ideally indicative of the presence of hydrocarbons.

Although seismic surveying is able to identify such structures, the technique is often unable to distinguish between the different possible compositions of pore fluids within them, especially for pore fluids which have similar mechanical properties. In the field of oil exploration, it is necessary to determine whether a previously identified reservoir contains oil or just aqueous pore fluids. To do this, often an exploratory well is drilled to determine the contents of the reservoir. However, this is an expensive process, and one which provides no guarantee of reward.

Thus, while oil-filled and water-filled reservoirs are mechanically similar, they do possess significantly different electrical properties and these properties provide for the possibility of electromagnetic based discrimination testing. Also, seismic techniques are not well adapted to the detection of certain other resistivity contrasts which may be useful in the identification of likely candidates for further hydrocarbon exploration.

A known technique for electromagnetic probing of subterranean rock strata is the passive magneto-telluric (MT) method, as described in GB2390904 to University of Southampton. In such a method, the signal measured by a surface-based electromagnetic detector in response to electromagnetic (EM) fields generated naturally, such as within the earth's upper atmosphere, can provide details about the surrounding subterranean rock strata.

However, for deep-sea surveys, all but those MT signals with periods corresponding to several cycles per hour are screened from the sea floor by the highly conductive seawater. Although long wavelength signals which do penetrate to the sea floor can be used for large scale undersea probing, they do not provide sufficient spatial resolution to examine the electrical properties of the typically relatively small scale subterranean reservoirs. Moreover, since MT surveying relies primarily on horizontally polarized EM fields, it is intrinsically insensitive to thin resistive layers.

Nonetheless, measurements of electrical resistivity beneath the sea floor have traditionally played a crucial role in hydrocarbon exploration and reservoir assessment and development. There are clear advantages to developing non-invasive geophysical methods capable of providing such information from the surface or seafloor. For example, the vast savings that may be realized in terms of avoiding the costs of drilling test wells into structures that do not contain economically recoverable amounts of hydrocarbon would represent a major economic advantage.

In research fields that are not of commercial interest, geophysical methods for mapping subterranean resistivity variations by various forms of EM surveying have been in use for many years. Proposals for finding hydrocarbon reservoirs using such EM surveying have also been made and applications to the direct detection of hydrocarbons using horizontal electric dipole (HED) sources and detectors have proved successful.

Thus, CSEM (Controlled Source Electromagnetics), is a technique of transmitting discrete, very low frequency electromagnetic energy using a current generating source, and an electric dipole. CSEM maps the resistivity contrasts in the subsurface. The method is sensitive to relatively high resistive formations imbedded in a relatively low resistive formation. The frequency range in CSEM is typically between $1/32$ Hz to 32 Hz; however, most applications are sub-hertz (less than 1 Hz).

In operation, a fleet of ocean-bottom receivers are deployed. The transmitting source is then towed above these receivers, and the receivers detect the transmitted EM field, which is altered by the presence of the varying resistivity of the subsurface within the range of the receivers.

A typical CSEM surveying system would have a transmitter antenna for use in EM surveying beneath the ocean floor and would include a current source housed in a fish and a dipole antenna. The dipole antenna comprises a first electrode mounted on a cable and located near the current source and a second electrode mounted on a cable and located farther away from the current source. Each electrode is electrically connected to the current source. The transmitter antenna may be deployed by being towed behind a vessel and various sensors may be mounted on each cable.

While such systems show promise in commercial exploration, they suffer from certain drawbacks and limitations. The range of such systems is determined by many factors, including frequency and current of the current source. Such systems have a single source, and thus the frequency and current are established by engineering factors, and cannot be varied outside rather limited parameters. The current state of the art involves using a single current source to output up to about 1600 Amperes. Those of skill in this art generally consider approximately 1700 Amperes to be the physical limit for a single source application, limited primarily by the cross-sectional diameter of current carrying conductors and the state of the art in the effectiveness of insulators.

Furthermore, such systems have a limited number or even just a single transmitter geometry, and are not adapted to scaling by the addition of components in various arrangements.

Thus, there remains a need for an EM system which provides flexibility in the arrangement of plural power sources to increase the effective range and capability of such known systems. The present invention addresses these and other drawbacks of the art.

SUMMARY OF THE INVENTION

The present invention solves these noted problems in the art by providing multiple sources in a controlled source electromagnetic (CSEM) survey system. In a first aspect, the present invention comprises a transmitter cable for use in electromagnetic surveying. The transmitter cable includes a dipole antenna comprising a first electrode on an antenna cable of a first length and a second electrode on an antenna cable of a second length; and a plurality of current sources electrically coupled to the dipole antenna.

In another aspect of the invention, a plurality of sources for a transmitter cable are provided. In a presently preferred embodiment, two antennas may be powered from each source. Alternatively, the outputs of each source are connected to a common antenna pair.

Also, a single large power supply may be mounted on a vessel to supply power through the tow cable. Alternatively, a number of power supplies may be provided, with each power supply having dedicated conductors through the tow cable to power the plurality of current sources.

These and other aspect, objects, and advantages of the invention will be readily apparent to those of skill in the art from a review of the following detailed description along with the accompanying drawings.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

DETAILED DESCRIPTION OF PREFERRED EMBODIMENTS

Figure 1:
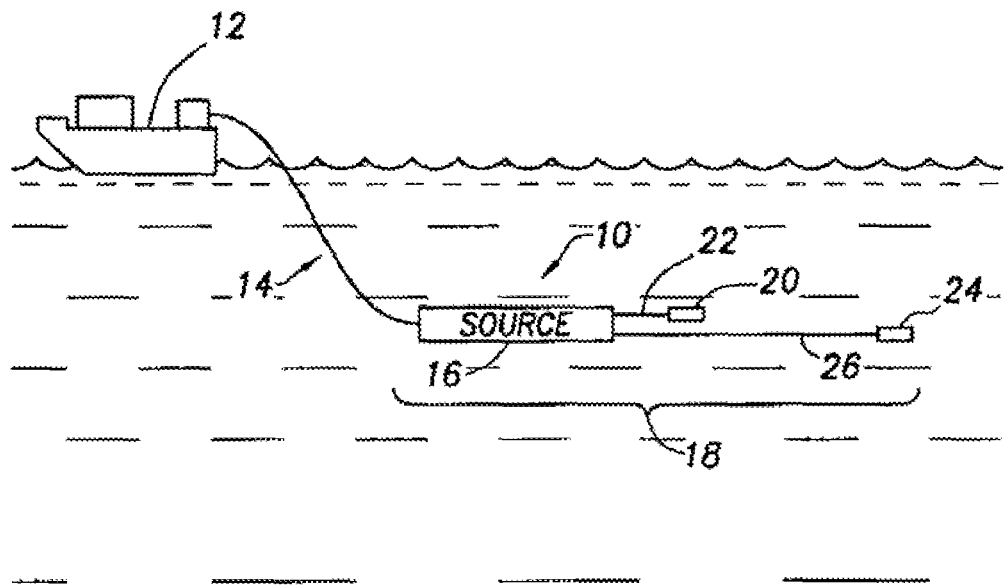
FIG. 1 is a schematic diagram of a known, prior art CSEM survey system.

FIG. 1 illustrates a typical single source EM surveying system transmitter antenna 10 towed behind a vessel 12 by a tow cable 14. The antenna 10 comprises a unitary current source 16 which may be housed within a fish for buoyancy to maintain a predetermined altitude above the ocean floor. The current source 16 provides current to a dipole antenna 18 which comprises a first electrode 20 mounted on a first, relatively short cable 22 and a second electrode 24 mounted on a second, relatively long cable 26. In that way, the first electrode is located nearer the source and the second electrode is located farther away from the source and the electromagnetic energy flows between the two electrodes through the seawater between them.

Both electrodes are powered from the same unitary source 16, and are therefore limited to the current provided by that one source and at the same frequency. The present invention is directed to overcoming this limitation in the art.

Figure 2:
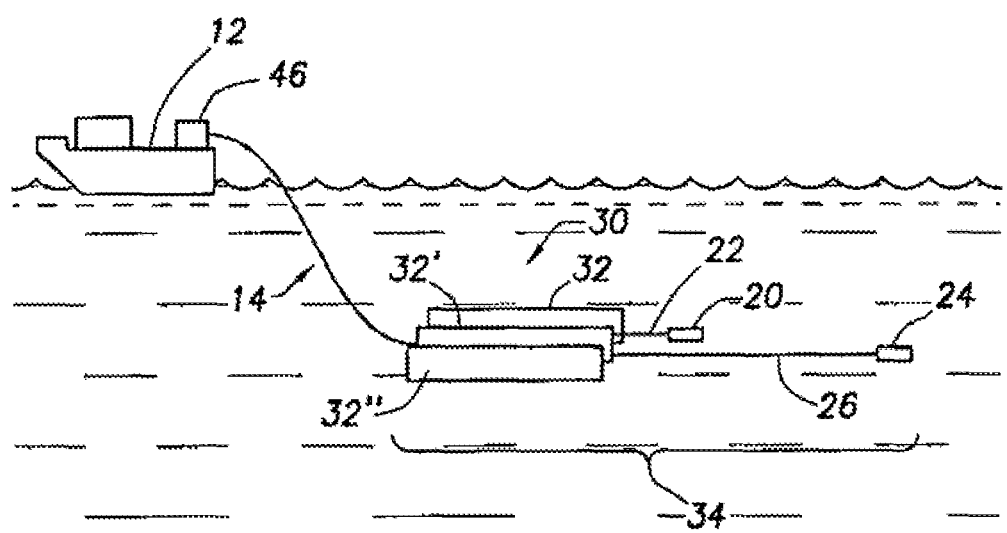
FIG. 2 is a schematic diagram of a CSEM survey system of the present invention using a plurality of sources, with three of such sources illustrated.

FIG. 2 depicts a transmitter antenna 30 of the present invention towed behind the vessel 12 by the tow cable 14, as before. In this instance, however, the transmitter antenna 30 comprises a dipole antenna 34 having two or more sources, shown as sources 32, 32', and 32" in FIG. 2, connected in parallel, although other geometries and antenna types may be used. The sources 32, 32', and 32" provide a plurality of currents and frequencies to the electrodes 20 and 24 through their respective cables 22 and 26.

The present invention has been described as comprising two or more sources. However, more than four such sources can become cumbersome to construct together, and may not provide much additional technical capability in relation to the increased complexity. However, the invention contemplates and includes such arrangements though they may not be preferred embodiments.

A number of arrangements may be used in powering a plurality of current sources from the vessel. One simple arrangement comprises providing a single, large power supply unit (PSU) aboard the vessel and conducting the power from the vessel to the plural sources through the tow cable. The tow cable may include one or more power conductors, and the power thus provided is common to each source.

Figure 3:
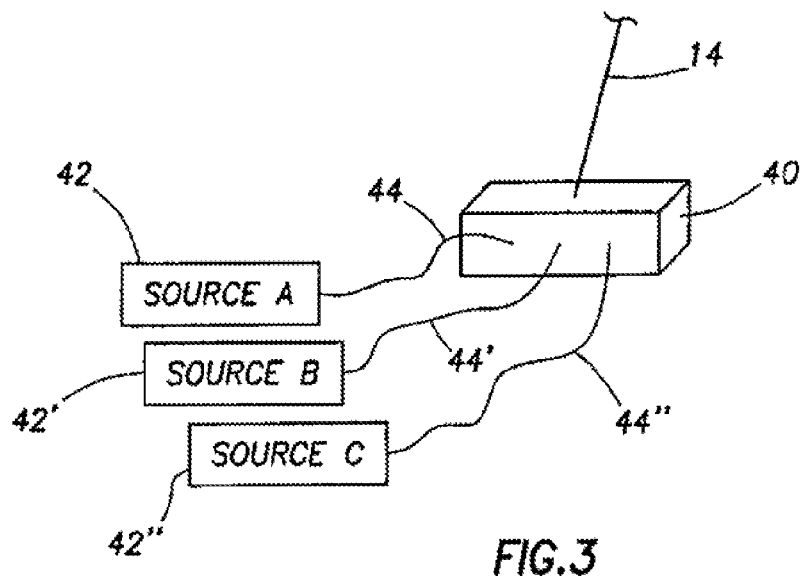
FIG. 3 is an electrical schematic diagram showing the distribution of power to a plurality of sources from a single source of electrical power aboard a vessel.

FIG. 3 depicts an electrical schematic for supplying a plurality of sources from a single PSU aboard the vessel. In this arrangement, power is conducted by conductors within the tow cable 14 to a junction or splitter box 40. The junction box 40 provides power to the sources labeled 42, 42', and 42" in FIG. 3. The power is carried over power cables 44, 44', and 44", respectively and is provided to the junction box from a power supply 46 aboard the vessel (see FIG. 2). Note that, with the arrangement as shown in FIG. 3, using multiple sources in parallel, a sum of the output currents is provided to the electrodes.

In an alternative preferred embodiment, a plurality of power supply units are provided aboard the vessel. By having a plurality of PSU's, one such PSU may be dedicated to providing power to each source separately. The tow-cable in that case comprises multiple power conductors. A pair of conductors (power and return) is dedicated to each source, i.e. two sources require a quad cable, and so on. One advantage of this scheme is that each source is isolated from the other (via the separate PSUs) and thus the power and frequency spectrum may be tailored to each environment for the survey. For example, a larger number of frequencies can be generated than may be possible with a complex waveform intended to deconvolve into multiple frequencies. Also, the power or current delivered at each frequency can be individually controlled, unlike the constraints inherent in a single waveform in which power delivered often declines with increased frequency. Furthermore, synchronizing each source to the other is a trivial matter as the AC output from the PSU (or multiple PSU's) to each source can be GPS locked. Thus, the invention allows an operator to use specific frequencies designed to reach different targets at different depths, and thereby provides the operator great flexibility in designing the survey.

Several schemes are possible for supplying current from each source to the antennas. One scheme involves keeping the antennas separate for each source, i.e. maintaining two antennas per source. This scheme is the simplest to implement electrically. By keeping the antennas and electrodes in parallel, each source sees its output impedance only; that is, adding multiple sources does not change the output impedance of another source. However, from an operational point of view, this scheme is more difficult than others.

Figure 4:
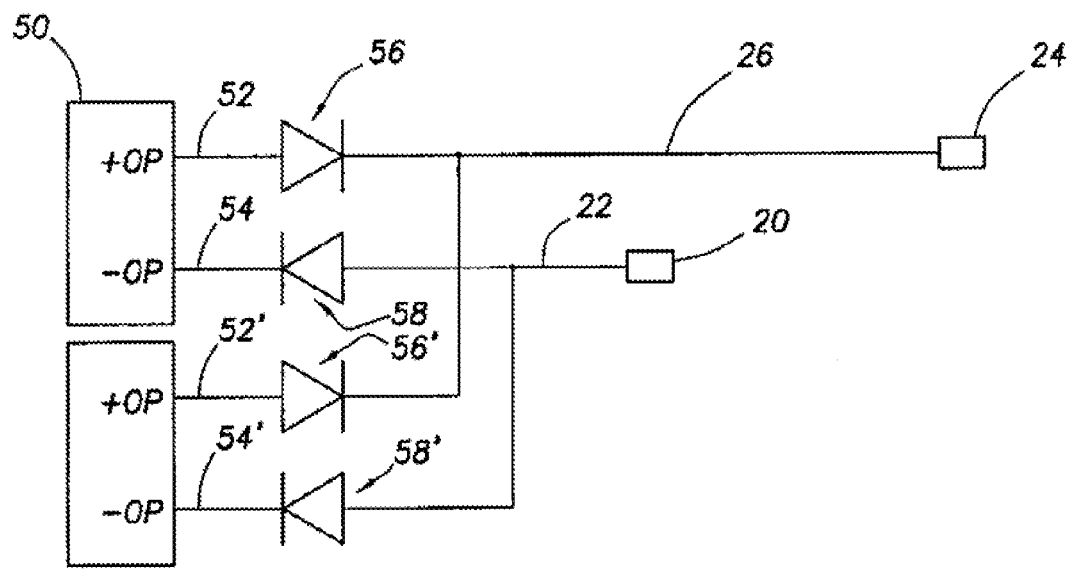
FIG. 4 is an electrical schematic diagram showing power distribution from a pair of sources to a single, dipole antenna.

In an alternative scheme, the outputs of each source are connected to a common antenna pair. In this scheme, each source must be electrically buffered or isolated from the others. This is achieved, for example, using power diodes on each output, as shown in FIG. 4. FIG. 4 shows a first source 50 and a second source 50'. The first source 50 includes a positive output 52 and a negative output 54 and the second source 50' includes a positive output 52' and a negative output 54'. The positive outputs 52, 52' are coupled to the cable 26 and thence to the electrode 24, and similarly the negative outputs 54, 54' are coupled to the cable 22 and thence to the electrode 20. The positive and negative outputs could also be coupled reciprocally to electrodes 20, 24, respectively. The power diodes thereby isolate the sources 50 and 50' from each other.

Operationally this is straightforward to deploy. However, the ability to deliver current becomes very dependent on the antenna impedance and contact impedance, i.e. the impedance of one antenna pair sets the total load impedance.

In summary, using multiple sources for the controlled source electromagnetic survey system as just described whose outputs are frequency and phase locked results in a total output equal to the summation of the individual sources. For example, using three 800 A sources is equivalent to a single 2400 A source. Also, using three sources allows the partitioning of the output energy in the frequency domain. In other words, if three sources are used, the first source may be directed to output lower frequencies, while the other two sources output medium and higher frequencies, respectively. Finally, a multiple source system may be used to partition energy into X, Y, and Z components. Currently, only the X axis is used in a typical system, as illustrated in FIG. 1. The system of the present invention as described in detail is inherently scaleable and configurable in power output, frequency distribution, and transmitter geometry.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the scope of the invention.

The invention claimed is:

1. A transmitter cable for use in electromagnetic surveying, comprising:
   an antenna; and
   a plurality of current sources electrically coupled to the antenna, wherein at least two of the plurality of current sources operate at different currents, wherein the antenna comprises:
   a first electrode on an antenna cable of a first length; and
   a second electrode on an antenna cable of a second length,
   wherein the antenna and current sources are configured to be carried by the transmitter cable to enable towing through a body of water to perform the electromagnetic surveying.

2. The transmitter cable of claim 1, wherein each of the plurality of current sources is electrically coupled to the first length cable and the second length cable.

3. The transmitter cable of claim 1, wherein the at least two of the plurality of current sources also operate at different frequencies, and the current delivered at each frequency is selectively controlled.

4. An apparatus for use in electromagnetic surveying, comprising:
   an antenna;
   a plurality of current sources electrically coupled to the antenna, wherein at least two of the plurality of current sources operate at different currents; and
   a tow cable to tow the antenna and plurality of current sources through a body of water to perform the electromagnetic surveying.

5. The apparatus of claim 4, wherein the antenna is a dipole antenna.

6. A transmitter cable for use in electromagnetic surveying, comprising:
   an antenna; and
   a plurality of current sources electrically coupled to the antenna, wherein at least two of the plurality of current sources operate at different currents, wherein the antenna comprises:
   a first electrode on an antenna cable of a first length; and
   a second electrode on an antenna cable of a second length;
   wherein each of the plurality of current sources is electrically coupled to the first length cable and the second length cable; and
   a power isolation diode between each of the plurality of current sources and the first length cable and the second length cable.

7. An apparatus for use in electromagnetic surveying, comprising:
   an antenna;
   a plurality of current sources electrically coupled to the antenna;
   a separate source of electrical power electrically coupled to each of the plurality of current sources; and
   a tow cable to tow the antenna and plurality of current sources through a body of water to perform the electromagnetic surveying.

8. A transmitter cable for use in electromagnetic surveying, comprising:
   an antenna; and
   a plurality of current sources electrically coupled to the antenna, wherein at least two of the plurality of current sources operate at different frequencies, wherein the antenna comprises:
   a first electrode on an antenna cable of a first length; and
   a second electrode on an antenna cable of a second length,
   wherein the antenna and current sources are configured to be carried by the transmitter cable to enable towing through a body of water to perform the electromagnetic surveying.

9. The transmitter cable of claim 8, wherein the plurality of current sources are electrically coupled in parallel.

10. The transmitter cable of claim 8, further comprising a common source of electrical power to the plurality of current sources.

11. A method of making an electromagnetic survey, comprising:
    towing an antenna through a body of water over a survey area to perform the electromagnetic survey;
    operating a first current source coupled to the antenna at a first frequency with a first current; and
    operating a second current source coupled to the antenna at a second frequency with a second current.

12. A transmitter cable for use in electromagnetic surveying, comprising:
    an antenna; and
    a plurality of current sources electrically coupled to the antenna, wherein at least two of the plurality of current sources operate at a same frequency and a same current, wherein the at least two of the plurality of current sources operate out of phase, wherein the antenna comprises:
    a first electrode on an antenna cable of a first length; and
    a second electrode on an antenna cable of a second length,
    wherein the antenna and current sources are configured to be carried by the transmitter cable to enable towing through a body of water to perform the electromagnetic surveying.

* * * * *